(12) United States Patent
Luker et al.

(10) Patent No.: US 11,381,664 B1
(45) Date of Patent: Jul. 5, 2022

(54) SYSTEMS AND METHODS FOR COMMUNICATING MESSAGES BETWEEN WEB AND NON-WEB SERVICES

(71) Applicants: Matthew R. Luker, Melbourne, FL (US); Mark A. Bellmore, Melbourne, FL (US); Christopher Beattie, Melbourne, FL (US); David M. Iodice, Melbourne, FL (US); Forrest Bland, Melbourne, FL (US)

(72) Inventors: Matthew R. Luker, Melbourne, FL (US); Mark A. Bellmore, Melbourne, FL (US); Christopher Beattie, Melbourne, FL (US); David M. Iodice, Melbourne, FL (US); Forrest Bland, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/140,713

(22) Filed: Jan. 4, 2021

(51) Int. Cl.
*H04L 67/51* (2022.01)
*G06F 16/95* (2019.01)
*H04L 67/02* (2022.01)
*H04L 67/55* (2022.01)

(52) U.S. Cl.
CPC ............. *H04L 67/51* (2022.05); *G06F 16/95* (2019.01); *H04L 67/02* (2013.01); *H04L 67/55* (2022.05)

(58) Field of Classification Search
CPC ......... H04L 67/16; H04L 67/02; H04L 67/26; G06F 16/95
See application file for complete search history.

(56) References Cited

U.S. PATENT DOCUMENTS

| 6,016,508 A    * | 1/2000 | Chu   ................. H04L 29/12009 709/203 |
| 10,693,884 B1 * | 6/2020 | Harris ................. H04L 63/0435 |
| 2002/0116454 A1* | 8/2002 | Dyla ..................... G06Q 30/06 709/203 |
| 2004/0006653 A1 | 1/2004 | Kamen et al. |
| 2005/0027886 A1 | 2/2005 | Putnam et al. |

OTHER PUBLICATIONS

International Search Report for corresponding PCT/US2021/059467 dated Feb. 18, 2022.

* cited by examiner

*Primary Examiner* — Andrew C Georgandellis
(74) *Attorney, Agent, or Firm* — Tarolli, Sundheim, Covell & Tummino LLP

(57) ABSTRACT

In an example, a system can include a web service interface (WSI) and a service directory for enabling communication between a web and non-web service. The WSI can be configured to communicate with the non-web service to receive reader data and/or writer data. The service directory can be configured to provide the WSI with non-web service subscriber data and/or non-web service publisher data for the non-web service in response to receiving the reader and/or writer data. The non-web service subscriber data identifies a web service as a subscriber of data provided by the non-web service and the non-web service publisher data identifies the web service as a publisher of data from which the non-web service is enabled to retrieve data. The WSI can be configured to provide the web service subscriber and/or publisher data to the non-web service to enable the non-web service to communicate with the web service.

18 Claims, 9 Drawing Sheets

SYSTEMS AND METHODS FOR COMMUNICATING MESSAGES BETWEEN WEB AND NON-WEB SERVICES

TECHNICAL FIELD

The present disclosure relates to systems and methods for communicating messages between a web service and a non-web service.

BACKGROUND

An Open Mission Systems (OMS) standard is an initiative focused on a creation of a common architecture for mission system payloads and subsystems that enable greater reuse and decreased integration risk for mission systems. A goal of the OMS standard is to develop industry consensus for a non-proprietary mission system architectural standard that enables affordable technical refresh and insertion, simplified mission systems integration, service reuse and interoperability, and competition across a lifecycle. As an example, the OMS standard can be used to define an aircraft mission system architecture that employs a service-oriented architecture, a defined message schema, software services application program interfaces (APIs), and isolate safety-critical aircraft subsystems.

SUMMARY

The present disclosure relates to systems and methods for communicating messages between a web service and a non-web service.

In an example, a system can include a web service interface (WSI) and a service directory. The WSI can be configured to communicate with a non-web service to receive reader data and/or writer data. The reader data can identify one or more services that have been granted permission to retrieve data provided by the non-web service, and the writer data can identify one or more services that have been granted permission to provide data to the non-web service. The service directory can be configured to provide the WSI with non-web service subscriber data and/or non-web service publisher data for the non-web service in response to receiving the reader and/or writer data. The non-web service subscriber data can identify a web service as a subscriber of data provided by the non-web service and the non-web service publisher data can identify the web service as a publisher of data from which the non-web service is enabled to retrieve data. The WSI can be configured to provide the web service subscriber data and/or web service publisher data to the non-web service to enable the non-web service to communicate with the web service.

In another example, a system can include memory to store machine readable instructions and data. The system can further include one or more processors to access the memory and execute the machine-readable instructions. The machine-readable instructions can cause the processor to receive reader data and/or writer data generated by a non-web service. The reader data can identify one or more services that have been granted permission to retrieve data provided by the non-web service and the writer data can identify one or more services that have been granted permission to provide data to the non-web service. The machine-readable instructions can further cause the processor to store at a publisher-subscriber database the reader and/or writer data for the non-web service and query the publisher-subscriber database for subscribers of data provided by the non-web service and/or publishers of data from which the non-web service is enabled to retrieve data. The machine-readable instructions can further cause the processor to generate non-web service subscriber data and/or non-web service publisher data in response to the querying of the publisher-subscriber database, and cause the non-web service subscriber data and/or non-web service publisher data to be provided to a WSI associated with the non-web service to provide the non-web service subscriber data and/or non-web service publisher data to the non-web service to enable the non-web service to communicate with the web service.

In a further example, a method can include receiving, at WSI, reader data and/or writer data generated by a non-web service. The WSI can be located at a critical abstract layer of a system configured according to an open mission system (OMS) standard that includes the non-web service. The method can further include generating, at a service directory, non-web service subscriber data and/or non-web service publisher data for the non-web service in response to storing the reader and/or writer data in a subscriber-publisher database, causing, at the WSI, the non-web service subscriber data and/or non-web service publisher data to be provided to the non-web service to enable the non-web service to communicate with a web service, and receiving, at the service directory, one or more web service requests for subscribers of data provided by the web service and/or publishers of data from which the web service is enabled to retrieve data. The publishers of data can include the non-web service. The method can further include generating web service subscriber data and/or web service publisher data in response to the one or more web service requests, and causing, at the service directory, the web service subscriber data and/or web service publisher data to be provided to the web service to enable the web service to communicate with the non-web service.

DETAILED DESCRIPTION

Figure 1:
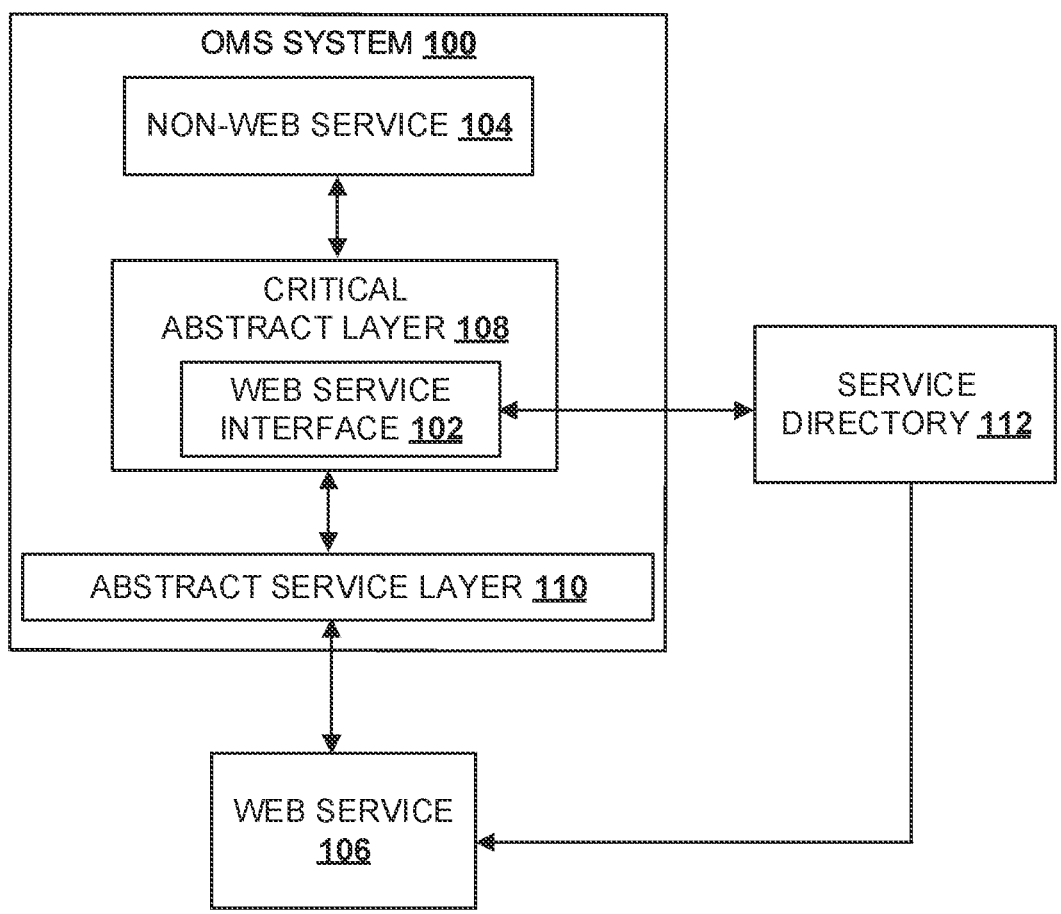
FIG. 1 is an example of an OMS system.

The present disclosure relates to systems and methods for communicating data between a web service and a non-web standard service.

Systems (e.g., an aircraft mission system, a weapon system, and the like) based on the OMS standard employ a service-oriented architecture wherein a message broker service is used to enable the exchanging of data as messages between a non-web service (e.g., an OMS service) and the web service. The message broker acts as an intermediary service and processes non-web standard messages from the web service to convert these messages into web ingestible messages at the web service. However, brokered message solutions for exchanging messages between the non-web service of an OMS system and the web service on an Internet, requires a commercial license and thus can be cost-prohibitive. Moreover, brokered message solutions increase the use of processing and memory capabilities of the OMS system, which may inhibit a performance of the OMS system.

The systems and methods described herein enable non-web standard services, such as OMS services, to communicate messages according to a Hypertext Transfer Protocol (HTTP) to a web service on the Internet or other OMS services of the OMS system without employing the message broker service. In some examples, according to the systems and methods described herein, the web service can be configured according to a representational state transfer (REST) standard. In some examples, RESTful web services can be programmed to follow a RESTful architecture for the web service. Web services that can conform to the RESTful architecture can be referred to RESTful web services. The systems and methods described herein enable abstracting a web service communication scheme from an existing standard (e.g., the OMS standard) that currently does not interface with the web service while maintaining compliance to both the existing standard and web service standard, thus allowing these disparate services to communicate without knowledge of the standards upon which these services have been built.

The systems and methods described herein employ a WSI at a CAL of the OMS system and a service directory to enable a non-web service of the OMS system to communicate with the web service based on the HTTP without requiring these messages to be handled by an intermediary service, and thus allowing for communication between disparate services (e.g., web and non-web services). Moreover, the systems and methods described herein increase interoperability of non-standard services of the OMS system across a common communication standard, decrease a need for technical expertise by those using web services, increase OMS system performance as no broker service is need for message communication, and reduce overall OMS system cost as no commercial license is required. While many examples are presented herein based on OMS services as the non-web standard services in context of an OMS system, the examples herein should not be construed and/or limited to only enabling OMS services of an OMS system to communicate with web services. The systems and methods described herein can be used to enable any non-web service to communicate and receive messages from a web service that employs a different standard from the non-web service.

FIG. 1 is an example of an OMS system 100 configured with a WSI 102 to enable a non-web service 104 of the OMS system 100 to communicate with a web service 106. In some examples, the non-web service 104 can be associated with an OMS subsystem of the OMS system 100. Thus, in some examples, the non-web service 104 can be employed by an OMS subsystem application. In some examples, the web service 106 can be associated with a web client. In other examples, the web service 106 can be implemented as a web API for the web client. In even further examples, the web service 106 can be implemented as part of the web client.

By way of example, if the OMS system 100 is implemented as an OMS-compliant weapon system, the non-web service 104 can be representative of an electro-optical and infrared (EO/IR) service for an EO/IR application of the OMS-compliant weapon system. In some examples, the non-web service 104 can be representative of a radar service, a capability/resource management service, or a mission planning service. The non-web service 104 can communicate with a CAL 108. The CAL 108 can include an OMS API for communicating data to and from a non-web service of a respective OMS system. Thus, the CAL can include an interface that can be defined by a translation of an OMS messaging schema (e.g., an extensive markup language (XML) schema) to software message types (e.g., CAL messages). As such, the CAL 108 can be employed in a corresponding OMS system for creation of CAL messages and manipulation of such messages (e.g., setting/accessing fields of the CAL messages). In some examples, the WSI 102 is implemented at the OMS API of the CAL 108.

The CAL 108 can be configured to interface with an ASL 110 of the OMS system 100. By employing the CAL 108 between the non-web service 104 and the ASL 110, the CAL 108 can isolate (e.g., segregate) the non-web service 104 from the ASL 110. Thus, the CAL 108 can abstract the non-web service 104 from a transport capabilities of the ASL 110. In some examples, the ASL 110 can be configured to enable non-web services to change transport mechanism without affecting a functionality of the non-web services. In further examples, the ASL 110 can be configured to provide a publisher-subscriber interface for non-web services configured for communication using a message broker service. By way of example, the ASL 110 can be representative of a transport mechanism that can be configured to support a transmission of command and control (C2) messages, data, and other signals provided by the non-web service 104. Thus, the non-web service 104 can be configured to utilize the CAL 108 to send and receive command and control initiatives (UCI) messages, data, or other signals. In some examples, the WSI 102 can be implemented as a web server and can be incorporated into the CAL 108 as a software plug-in.

In some examples, the ASL 110 can be referred to as an Abstract Service Bus (ASB). While the example of FIG. 1 illustrates the CAL 108 as separate from the ASL 110, in some examples, the ASL 110 can include the CAL 108. Thus, in some examples, the WSI 102 can be implemented at the ASL 110. In some examples, the ASL 110 can include any number of transport mechanisms including software and hardware components. The ASL 110 can be configured to enable mission service functions to be available to other services, subsystems and/or resources. For example, the ASL 110 can include a middleware layer, network layer, and transport layer. In some examples, the ASL 110 can include physical interfaces (e.g., an Ethernet interface connection or port), data transfer interfaces, special signal interface, core capabilities, and/or security information exchanges. By employing the WSI 102 at the CAL 108, the non-web service 104 of the OMS system 100 can be enabled to communicate with the web service 106. The web service 106 can reside on an Internet (not shown in FIG. 1). In some examples, the web service 106 can reside in a cloud computing environment. Existing OMS systems are currently configured to communicate with an outside web-service, such as the web service 106 utilizing a message broker service. However, brokered message solutions for exchanging messages with the outside web-service, require a commercial license. Moreover, brokered message solutions increase the use of processing and memory capabilities of an OMS system, which may inhibit a performance of the OMS system. By employing the WSI 102 at the CAL 108, in combination with a service directory 112, enables the non-web service 104 to communicate with the web service 106 without using a message broker service.

In some examples, the WSI 102 can be configured to communicate with the service directory 112. Although in the example of FIG. 1 the service directory 112 is outside the OMS system 100, in some examples, the OMS system 100 can include the service directory 112. The service directory 112 can store non-web service subscriber data and/or web service subscriber data. The non-web service subscriber data can identify one or more other services, such as the web service 106 and/or another non-web service of the OMS system 100 (not shown in FIG. 1) as subscribers of messages generated by the non-web service 104. In some examples, the non-web service subscriber data can identify one or more topics for each of the subscribers of the messages generated by the non-web service 104 intended for the one or more other services. In some examples, the non-web service 104 can be configured to send data to the one or more other services based on a respective topic of the one or more topics of the non-web service subscriber data. Thus, the non-web service subscriber data can identify the one or more topics and associated one or more subscribers that are to receive respective messages generated by the non-web service 104.

In some examples, the web service subscriber data can identify the one or more other services, such as the non-web service 104 and/or the other non-web service of the OMS system 100 as subscribers of messages generated by the web service 106. In some examples, the web service subscriber data can identify one or more topics for each of the subscribers of the messages generated by the web service 106 intended for the one or more other services. In some examples, the web service 106 can be configured to send data to the one or more other services based on a respective topic of the one or more topics of the web service subscriber data. Thus, the web service subscriber data can identify one or more subscribers that are to receive the messages generated by the web service 106. In some examples, the service directory 112 can be configured to store web service publisher data. The web service publisher data can identify one or more services (e.g., the non-web service 104 and/or the other non-web service) from which the web service 106 can retrieve data. In further examples, the service directory 112 can be configured to store non-web service publisher data. The non-web service publisher data can identify one or more services (e.g., the web service 106 and/or the other non-web service) from which the non-web service 104 can retrieve data.

In some examples, the service directory 112 can be configured to receive reader and writer data generated by the non-web service 104. The reader data can identify one or more services (e.g., the web service 106 and/or the other non-web service) that have been granted permission to retrieve (e.g., read) data that is provided by the non-web service 104. The writer data can identify one or more services (e.g., the web service 106 and/or the other non-web service) that have been granted permission to provide (e.g., write) data to the non-web service 104. In some examples, the non-web service 104 can be configured to provide the reader and writer data to the service directory 112 by invoking the WSI 102. For example, the WSI 102 can be configured to encapsulate the reader and writer data as one or more messages and provide the one or more messages to the service directory 112. The service directory 112 can be configured to generate the web service subscriber data and/or the web service publisher data based on the reader and/or writer data. In other examples, the web service subscriber data and/or the web service publisher data can be generated based on a user input (e.g., at an input device). In some examples, the non-web service subscriber data and/or the non-web service publisher data can be generated based on the user input (e.g., at the input device).

In some examples, the WSI 102 can be configured to encapsulate data from the non-web service 104 intended for the web service 106 according to an HTTP to generate an encapsulated message. In some examples, the WSI 102 can be configured to encapsulate data from the non-web service 104 intended for the service directory 112 and/or other non-web services of the OMS system 100 according to the HTTP. For example, the WSI 102 can be configured to receive the data from the non-web service 104. The data can identify the web service 106 as an intended recipient of the message and can include other data. In some examples, the other data is status data that can be indicative of whether the non-web service 104 is functional (e.g., online). In some examples, the other data is UCI data. By way of further example, the data provided by the non-web service 104 can have a standard file format. For example, the file format can be a standard file format, such as JavaScript Object Notation (JSON). The WSI 102 can be configured to encapsulate the data provided by the non-web service 104 intended for the web service 106 according to the HTTP to generate the encapsulated message. In some examples, the WSI 102 can be configured to encapsulate the data provided by the non-web service 104 intended for the service directory 112 according to the HTTP to generate the encapsulated message. In even further examples, the WSI 102 can be configured to encapsulate the data provided by the non-web service 104 intended for the other non-web service according to the HTTP to generate the encapsulated message.

In some examples, the WSI 102 can be configured to insert routing data into the encapsulated message for routing of the encapsulated message to the web service 106, the web service 106, or the other non-web service of the OMS system 100. For example, the WSI 102 can be configured to communicate to the encapsulated message over the ASL 110 to the Internet to provide the encapsulated message to the web service 106. In some examples, the service directory 112 is implemented on the Internet and the WSI 102 can be configured to communicate to the encapsulated message over the ASL 110 to the Internet to provide the encapsulated message to the service directory 112. In some examples, the WSI 102 can be configured to implement HTTP methods (also known as HTTP verbs) to communicate the encapsulated messages to the web service 106, the service directory 112, or the other non-web service. Example HTTP methods that the WSI 102 can be configured to implement can include POST, GET, PUT, PATCH, DELETE, which can correspond to create, read, update, and/or delete (or CRUD) operations, respectively. In some examples, the web service 106 can be configured to implement the HTTP methods and thus enabling the web service 106 to provide one or more encapsulated messages intended for non-web service 104 and/or the service directory 112.

In some examples, a non-web service registration process can be implemented to enable the non-web service 104 to communicate with the web service 106 and/or the other non-web service of the OMS system 100. At least some of the functions of the non-web service registration process can be implemented by the non-web service 104 and other functions of the non-web service registration process can be implemented by the service directory 112. For example, upon initialization of the non-web service 104, during the non-web service registration process, the non-web service 104 can be configured to employ the WSI 102 to communicate the reader data and writer data (e.g., as one or more messages) to the service directory 112. In some examples, if the service directory 112 is offline when the non-web service 104 is functional (e.g., online), and comes back online, the service directory 112 can be configured to monitor for a message that includes a service request from the non-web service 104. The service request can be indicative of a request to communicate with the web service 106 and/or the other non-web service. In some examples, during the non-web service registration process, the service directory 112 can be configured to issue a request for the reader and writer data as one or more messages to the non-web service 104. In some examples, the request for the reader and/or writer data is issued by the service directory 112 in response to receiving the service request.

In some examples, during the non-web service registration process, the WSI 102 can be configured to receive the request for the reader and writer data and provide the request to the non-web service 104. During the non-web service registration process, the non-web service 104 can be configured to invoke the WSI 102 to communicate the reader data and writer data (e.g., as the one or more messages) to the service directory 112 in response to the request for the reader and writer data. During the non-web service registration process, the service directory 112 can be configured to communicate the non-web service subscriber data and/or the non-web service publisher data as one or more messages to the WSI 102. For example, the service directory 112 can be configured to communicate the non-web service subscriber data and/or the non-web service publisher data in response to receiving the reader and/or writer data from the non-web service 104. The WSI 102 can be configured to extract the non-web service subscriber data and/or the non-web service publisher data from the one or more messages and provide the extracted non-web service subscriber data and/or the non-web service publisher data to the non-web service 104 to enable the non-web service 104 to communicate with the web service 106, thereby completing the non-web service registration process.

In some examples, a web service registration process can be implemented to enable the web service 106 to communicate with the non-web service 104. At least some of the functions of the web service registration process can be implemented by the web service 106 and other functions of the web service registration process can be implemented by the service directory 112. For example, during the web service registration process, the web service 106 can be configured to generate one or more messages that include one or more requests for subscribers of data generated by the web service 106 and/or publishers from which the web service 106 can retrieve data. The one or more requests generated by the web service 106 can be provided to the service directory 112. During the web service registration process, the service directory 112 can be configured to generate one or more messages that include the web service subscriber data and/or the web service publisher data based on the reader and/or writer data. In some examples, the reader and/or writer data can be provided during the non-web service registration process, as described herein. During the web service registration process, the service directory 112 can be configured to communicate the web service subscriber data and/or the web service publisher data to web service 106. The web service 106 can be configured to extract the web service subscriber data and/or the web service publisher data from the message to enable the web service 106 to communicate with the non-web service 104, thereby completing the web service registration process.

In some examples, during operation, the non-web service 104 can be configured to issue a message that includes a delete request to remove the non-web service 104 as a publisher and a subscriber from the service directory 112. For example, the non-web service 104 can be configured to issue the delete request before going offline, such, as in response to another service, application, or based on the user input. The service directory 112 can be configured to delete the writer and reader data in response to the delete request. In other examples, the service directory 112 can be configured to remove the non-web service 104 as the publisher and the subscriber in response to not receiving status data for a period of time. For example, the non-web service 104 can be configured to communicate the status data indicative of whether the non-web service 104 is functional (e.g., online) as a message by invoking the WSI 102. If the service directory 112 does not receive the service data after or within the period of time this can be indicative that the non-web service 104 is offline. The service directory 112 can be configured to delete the writer and reader data for the non-web service 104 in response to determining that the non-web service 104 is offline, thereby removing the non-web service 104 as publisher of data for the one or more services (e.g., the web service 106 and/or the other non-web service) and subscriber of data from the one or more services (e.g., the web service 106 and/or the other non-web service).

In some examples, the service directory 112 can be configured to provide updated web service subscriber data and/or updated web service publisher data that does not identify the non-web service 104 as a subscriber of messages generated by the web service 106 and/or a service from which the web service 106 can retrieve data in response to the delete request or determining that the non-web service 104 is offline. The service directory 112 can be configured to provide the updated web service subscriber data and/or updated web service publisher data to the web service 106 in a same or similar manner as the web service subscriber data and/or web service publisher data, as described herein. In additional or alternative examples, the service directory 112 can be configured to provide the other non-web service with updated non-web service subscriber data and/or non-web service publisher data that does not identify the other non-web service as a subscriber of messages generated by the web service 106 and/or a service from which the other non-web service can retrieve data in response to the delete request or determining that the non-web service 104 is offline.

Accordingly, by employing the WSI 102 at the CAL 108 of the OMS system 100 in combination with the service directory 112 enable the non-web service 104 on an OMS system side to communicate with the web service 106 without a message broker service and thus an intermediary service. Thus, communication between disparate services can be enabled by the WSI 102 and the service directory 112. Moreover, by introducing the WSI 102 into the CAL 108, combined with the service directory 112, enables abstracting a communication between the non-web service 104 and the web service 106. By abstracting the communication, services 104 and 106 of each standard are unaware of a technology standard upon which the other service was built. As such, by employing the WSI 102 at the CAL 108 in combination with the service directory 112 enables the non-web service 104 of the OMS system 100 to communicate and receive messages from the web service 106 without modification of the non-web service 104.

Figure 2:
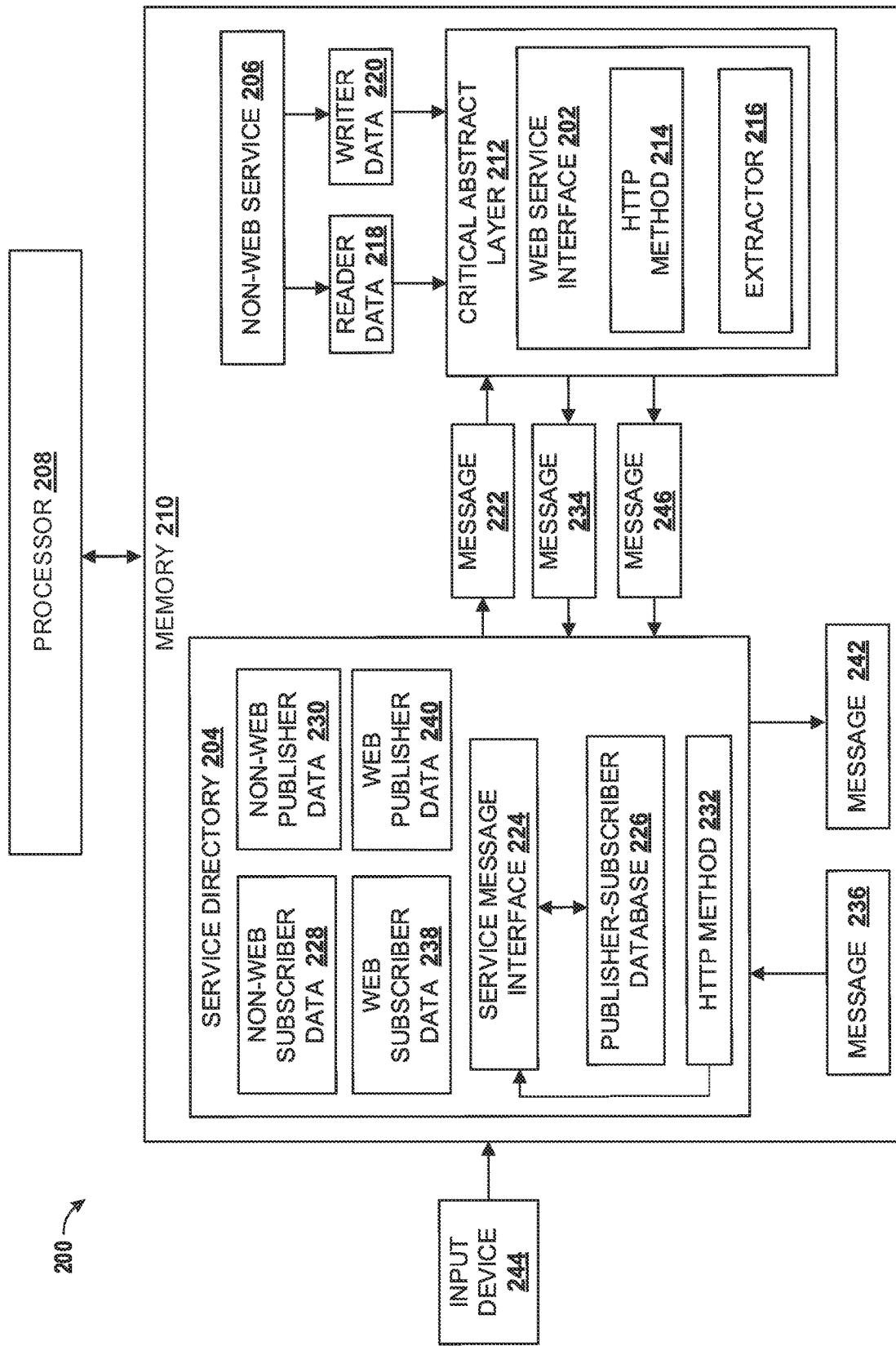
FIG. 2 is an example of another OMS system.

FIG. 2 is an example of an OMS system 200 configured with a WSI 202 and a service directory 204 for enabling a non-web service 206 to communicate with one or more other non-web services and/or a web service. The web service can be the web service 106, as shown in FIG. 1. Thus, the following description of FIG. 2 can also refer to FIG. 1. In some examples, the non-web service 206 is the non-web service 104, as shown in FIG. 1. In alternative examples, the one or more other non-web services is the non-web service 104, as shown in FIG. 1. In some examples, the OMS system 200 is the OMS system 100, as shown in FIG. 1. For clarity and brevity purposes other elements of the OMS system 200 have been omitted. By configuring the OMS system 200 with the WSI 202 and the service directory 204 enables the non-web service 206 to communicate data as messages (e.g., HTTP messages) with the one or more other non-web services and/or the web service. In some examples, the data is a message, such as a UCI message.

In some examples, the OMS system 200 can include one or more processors 208 and a memory 210. The memory 210 can store machine-readable instructions that can be retrieved and executed by the one or more processors 208 for enabling the non-web service for communication with the web service and/or the one or more non-web services as described herein. By way of example, the memory 210 can be implemented, for example, as a non-transitory computer storage medium, such as volatile memory (e.g., random access memory), non-volatile memory (e.g., a hard disk drive, a solid-state drive, a flash memory, or the like) or a combination thereof. The one or more processors 208 could be implemented, for example, as one or more processor cores. In the present example, although the components of the OMS system 200 are illustrated as being implemented on the same system, in other examples, the components could be distributed across different systems (e.g., computers, devices, etc.) and communicate, for example, over a network (e.g., a wireless and/or wired network). By way of example, the network can be an avionics bus network (ABN) of an aerial vehicle, such as a manned or an unmanned aerial vehicle.

In some examples, the memory 210 can include a CAL 212. The CAL 212 can be the CAL 108, as shown in FIG. 1. The WSI 202 can be located at the CAL 212. The WSI 202 can include an HTTP method 214 and an extractor 216. The HTTP method 214 can be programmed to encapsulate data (e.g., status data, UCI messages, etc.) provided by the non-web service 206 according to the HTTP to provide encapsulated messages. Thus, the HTTP method 214 can be programmed to provide HTTP messages that include the data provided by the non-web service 206. The extractor 216 can be programmed to receive encapsulated message from the CAL 212 for the non-web service 206, extract data in the encapsulated messages and provide the extracted data to the non-web service 206.

In some examples, the non-web service 206 can be programmed to communicate with the service directory 204 to register with service directory 204 to enable the non-web service 206 to communicate with the one or more other non-web services and/or the web service. For example, the non-web service 206 can be programmed to invoke the HTTP method 214 to communicate reader data 218 and writer data 220 as one or more encapsulated messages 222 to the service directory 204. In some examples, the service directory 204 is not implemented as a part of the OMS system 200. The reader and writer data 218 and 220 can correspond to the reader and writer as described herein (e.g., with respect to FIG. 1).

The service directory 204 can include a service message interface (SMI) 224 and a publisher-subscriber database 226. In some examples, the publisher-subscriber database 226 can include a table identifying each topic, associated subscribers, and publishers of said topic for each non-web and web service (e.g., the non-web service 206 and the web service (e.g., the web service 106, as shown in FIG. 1), and in some examples, the other non-web service). The SMI 224 can be programmed to extract the reader and writer data 218 and 220 from the one or more encapsulated messages 222 and store the reader and writer data 218 and 220 in the publisher-subscriber database 226. In some examples, the SMI 224 can be programmed to query the publisher-subscriber database 226 one or more times for subscribers of data provided by the non-web service 206 and/or publishers of data from which the non-web service 206 can retrieve data. In some examples, the SMI 224 can be programmed to query the publisher-subscriber database 226 for the subscriber and publishers of data in response to storing the reader and writer data 218 and 220 in the publisher-subscriber database 226 or receiving a subsequent request for the subscribers of data provided by the non-web service 206 and/or publishers of the data from which the non-web service 206 can be retrieved.

The publisher-subscriber database 226 can be programmed to provide non-web service subscriber data 228 and/or non-web service publisher data 230 similar to the non-web service subscriber data and/or non-web service publisher data described herein (e.g., with respect to FIG. 1). The SMI 224 can be programmed to invoke an HTTP method 232 to communicate the non-web service subscriber data 228 and/or non-web service publisher data 230 as one or more encapsulated messages 234 to the CAL 212. The CAL 212 can be programmed to provide the one or more encapsulated messages 234 to the WSI 202, which the extractor 216 can be programmed to extract the non-web service subscriber data 228 and/or non-web service publisher data 230 from the one or more encapsulated messages 234. The extractor 216 can be programmed to provide the non-web service subscriber data 228 and/or non-web service publisher data 230 to the non-web service 206 to enable the non-web service 206 to communicate with the web service and/or the one more other non-web services, thereby registering the non-web service 206 with the service directory 204.

In some examples, the service directory 204 can be programmed to receive one or more encapsulated messages 236 that includes one or more requests for subscribers of data provided by the web service and/or publishers of data from which the web service can retrieve data. The one or more encapsulated message 236 can be generated by the web service, such as the web service 106, as shown in FIG. 1. The SMI 224 can be programmed to extract the one or more requests from the one or more encapsulated messages 236. The SMI 224 can be programmed to query the publisher-subscriber database 226 one or more times for the subscribers of data provided by the web service and/or publishers of data from which the web service can retrieve data in response to the one or more requests. The publisher-subscriber database 226 can be programmed to provide web service subscriber data 238 and/or web service publisher data 240 similar to the web service subscriber data and/or web service publisher data described herein (e.g., with respect to FIG. 1). The SMI 224 can be programmed to invoke the HTTP method 232 to communicate the web service subscriber data 238 and/or web service publisher data 240 as one or more encapsulated messages 242 to the web service to enable the web service to communicate with the non-web service 206 and/or the one or more other non-web services, thereby registering the web service with the service directory 204.

In some examples, the web service subscriber data 238 and/or web service publisher data 240 can be generated based on a user input at an input device 244 (e.g., a keyboard, a mouse, etc.). For example, a user can employ the input device 244 to interact with the publisher-subscriber database 226 to define subscribers and publishers for the web service. The service directory 204 can configured to generate a graphical user interface (GUI) on a display device with which the user can employ the input device 244 to interact with the publisher-subscriber database 226. In some examples, the input device 244 can be used to identify the one or more services that have been granted to read data provided by the non-web service 206 and the one or more services that have been granted to write data to the non-web service 206. Thus, in some examples, the input device 244 can be used to provide the reader and writer data 218 and 220.

In some examples, the non-web service 206 can be configured to issue a delete request to remove the non-web service 206 as a publisher and a subscriber from the publisher-subscriber database 226. For example, the non-web service 206 can be configured to issue the delete request prior to going offline, such, as in response to another service, application, or based on the user input at the input device 244. In other examples, the service directory 204 can be configured to remove the non-web service 206 as the publisher and the subscriber in response to not receiving status data for a defined period of time. For example, the non-web service 206 can be configured to communicate periodically status data indicative of whether the non-web service 206 is functional (e.g., online). If the SMI 224 does not receive the service status data within or after the defined period of time this can be indicative that the non-web service 206 is offline. The status data can be provided by the HTTP method 214 as an encapsulated message 246. The SMI 224 can be programmed to delete the writer and reader data 218 and 220 stored in the publisher-subscriber database 226 in response to determining that the non-web service 206 is offline.

In some examples, The SMI 224 can be programmed to query the publisher-subscriber database 226 to provide updated web service subscriber data and/or updated web service publisher data that does not identify the non-web service 206 as a subscriber of messages generated by the web service or a service from which the web service can retrieve data in response to the delete request or determining that the non-web service 206 is offline. The SMI 224 can be programmed to provide the updated web service subscriber data and/or updated web service publisher data to the web service in a same or similar manner as the web service subscriber data 238 and/or the web service publisher data 240, as described herein. Accordingly, by employing the WSI 202 at the CAL 212 of the OMS system 200 in combination with the service directory 204 enable the non-web service 206 of the OMS system 200 to communicate with the web service without a message broker service and thus an intermediary service. Thus, communication between disparate services can be enabled by the WSI 202 and the service directory 204.

Figure 3:
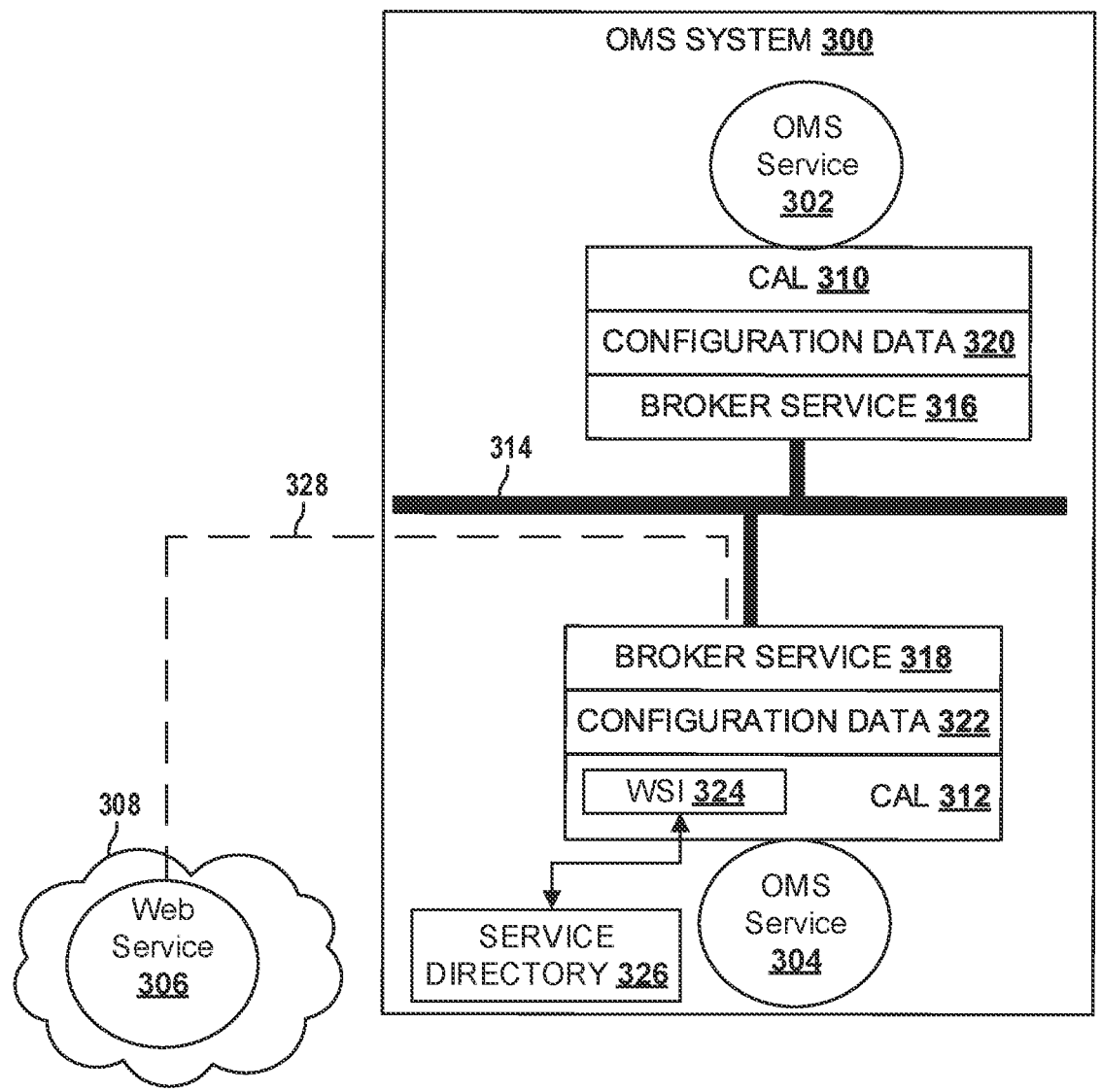
FIG. 3 is a further example of an OMS system.

FIG. 3 is an example of an OMS system 300. The OMS system 300 can correspond to the OMS system 100, as shown in FIG. 1 or the OMS system 200, as shown in FIG. 2. Thus, the following description of FIG. 3 can also can refer to FIGS. 1 and 2. In some examples, the OMS system 300 can include a first OMS service 302 and a second OMS service 304. For clarity and brevity purposes other elements of the OMS system 300 have been omitted. By way of example, the OMS System 300 can be representative of an OMS weapon system. Thus, in some examples, the first OMS service 302 can be a sensor service of the OMS weapon system (e.g., an EO/IR service for an EO/IR application of the OMS weapon system). By way of example, the second OMS service 304 can be an infrared search and track (IRST) service for an IRST application of the OMS weapon system. In other examples, the second OMS service 304 can be an aggregator service. In some examples, as described herein, the second OMS service 304 can be configured to exchange data (e.g., UCI messages) with a web service 306. The web service 306 can be implemented on an Internet 308 (e.g., in a cloud environment). In an example, the web service 306 can be representative of a user interface service that a user can employ to control the OMS weapon system. For example, if the OMS weapon system is employed on an aerial vehicle, manned or unmanned, the web service 306 can allow the user to control the OMS weapon system remotely, such as via an operator console. In some examples, the web service 306 could be implemented as a data collector service. For example, the web service 306 can be configured to receive or retrieve sensor data provided by the sensor service (e.g., the first OMS service 302) for determining a performance of the sensor service. In some examples, the sensor service can be configured to provide performance data indicative of the performance of the sensor service. The received or retrieved sensor data, or in some examples, the performance data, can be provided to the web service 306 as one or more messages as described herein.

Each of the first and second OMS services 302 and 304 can interface with a respective first and second CAL 310 and 312. An OMS reference implementation of the ASL 314 and the first and second CALs 310 and 312 can support a message exchange using a respective first and second broker service 316 and 318 based on a publish-subscribe paradigm. By way of example, the first and second broker services 316 and 318 can be implemented as Java multiprotocol message broker services, such as Apache ActiveMQ from Apache Software Foundation®. Each of the first and second broker services 316 and 318 can be configured based on respective configuration data 320 and 322. The respective configuration data 320 and 322 for each broker service 316 and 318 can define which services can communicate with a respective OMS service 302 and 304, and thus can characterize the publisher-subscriber paradigm for the respective first and second OMS services 302 and 304. In some examples, the configuration data 320 and 322 can be represented as a plain text file or an extensible markup language (XML) file. Each of the first and second broker service 316 and 318 can receive data from a respective one of the first and second OMS services 302 and 304 and encapsulate the data to an OMS format for communication using the ASL 314 to the other broker service 316 and 318 for processing for a remaining OMS service of one of the first and second OMS services 302 and 304.

In some examples, the second CAL 312 can include a WSI 324. The WSI 324 can be the WSI 102, as shown in FIG. 1, or the WSI 202, as shown in FIG. 2. The WSI 324 can be configured to encapsulate data (e.g., the UCI message) from the second OMS service 304 intended for the web service 306 according to a HTTP to generate an encapsulated message. The WSI 324 can be configured to communicate with a service directory 326. The service directory 326 can be the service directory 112, as shown in FIG. 1, or the service directory 204, as shown in FIG. 2. The service directory 326 can be employed to enable the second OMS service 304 to communicate messages (e.g., HTTP messages) with the web service 306 in a same or similar manner as described herein (e.g., with respect to FIGS. 1 and/or 2).

In some examples, the second OMS service 304 can be configured to provide the data to the WSI 324 with information identifying the web service 306. The WSI 324 can be configured to encapsulate the data (e.g., by invoking the HTTP method 214, as shown in FIG. 2) to provide an encapsulated message. The encapsulated message can be communicated over a communication link 328 to the web service 306 on the Internet 308. The communication link 328 can include one or more physical and/or logical connections between the OMS system 300 and a system executing the web service 306, such as a server on the Internet 308. By way of further example, at least a portion of the communication link 328 can be established across the ASL 314, which can include communication elements (e.g., internet connection circuitry and/or devices) for connecting the OMS system 300 to the Internet 308. Because the second CAL 312 employs the WSI 324, the second OMS service 304 can send data to the web service 306 and receive data from the web service 306. The first OMS service 304 is isolated from the Internet 308 and thus cannot communicate with the web service 306, such as the second OMS service 304.

Figure 4:
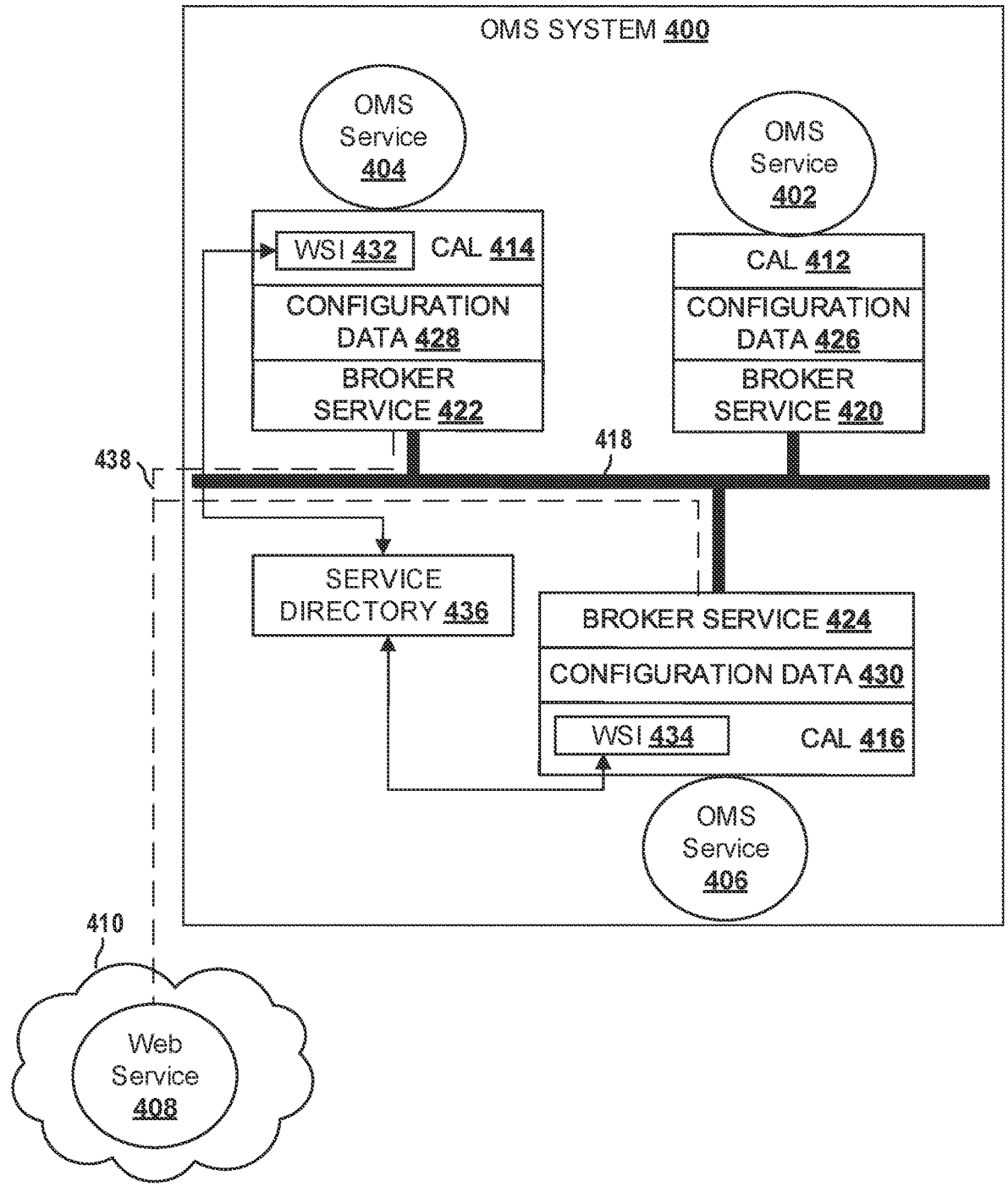
FIG. 4 is another example of an OMS system.

FIG. 4 is another example of an OMS system 400. The OMS system 400 can correspond to the OMS system 100, as shown in FIG. 1, or the OMS system 200, as shown in FIG. 2. Thus, the following description of FIG. 4 can also can refer to FIGS. 1 and 2. In some examples, the OMS system 400 can include a first OMS service 402, a second OMS service 404, and a third OMS service 406. For clarity and brevity purposes other elements of the OMS system 400 have been omitted. By way of example, the OMS System 400 can be representative of an OMS weapon system. Thus, in some examples, the first OMS service 402 can be an EO/IR service for an EO/IR application of the OMS weapon system. The second OMS service 404 can be an IRST service for an IRST application of the OMS weapon system. In some examples, the second OMS service 404 can be a log aggregator service. The third OMS service can be a synthetic-aperture radar (SAR) service for an SAR application of the OMS system 400. In some examples, the third OMS service 406 can be a mission planner service for controlling the second OMS web service 404. In some examples, the first and second OMS services 402 and 404 can be designated as tier 3 services indicative of being fully compliant with the OMS standard. The third OMS service 406 can be designated as a tier 2 service indicative of being partially compliant with the OMS standard.

In some examples, the second and third OMS services 404 and 406 can be configured to exchange data (e.g., UCI messages) with a web service 408. The web service 408 can be implemented on an Internet 410 (e.g., in a cloud environment). Thus, in some examples, tier 2 and 3 services of the OMS system 400 can be enabled to communicate with the web service 408 being implemented on the Internet 410. In an example, the web service 408 can be representative of a user interface service that a user can employ to control the OMS weapon system. By way of further example, the web service 408 can be configured to receive or retrieve mission plan data from the third OMS service 406 for displaying relevant mission information on user interface. In some examples, the web service 408 can be configured to track EO/IR metrics.

Each of the first, second, and third OMS services 402, 404, and 406 can be configured to interact with a respective first, second, and third CAL 412, 414, and 416. An OMS reference implementation of an ASL 418 of the OMS system 400 and the first, second, and third CALs 412, 414, and 416 can support a message exchange using a respective first, second, and third broker service 420, 422, and 424 based on a publish-subscribe paradigm. By way of example, the first, second, and third broker services 420, 422, and 424 can be implemented as Java multiprotocol message broker services, such as Apache ActiveMQ from Apache Software Foundation®. Each of the first, second, and third broker services 420, 422, and 424 can be configured based on respective configuration data 426, 428, and 430. The respective configuration data 426, 428, and 430 for a respective one of the first, second, and third broker services 420, 422, and 424 can define which services can communicate with a respective one of the first, second, and third OMS services 402, 404, and 406, and thus can characterize the publisher-subscriber paradigm for the first, second and third OMS services 402, 404, and 406.

In some examples, the configuration data 426, 428, and 430 can be represented as a plain text file or an XML file. Each of the first, second, and third broker services 420, 422, and 424 can receive data from the respective one of the first, second, and third OMS services 402, 404, and 406 and encapsulate the data to a proper OMS format. The encapsulated data can be communicated using the ASL 418 to one of the remaining broker services of the first, second, and third broker services 420, 422, and 424 for processing for a remaining OMS service of one of the respective first, second, and third OMS services 402, 404, and 406.

In some examples, the second and third CALs 414 and 416 can include a respective first and second WSIs 432 and 434. The first and second WSIs 432 and 434 can be similar to WSI 102, as shown in FIG. 1, or the WSI 202, as shown in FIG. 2. Each of the first and second WSIs 432 and 434 can be configured to encapsulate data (e.g., UCI messages) from a respective one of the second and third OMS services 404 and 406 that can be intended for the web service 306 or one of a remaining second and third OMS services 404 and 406 based on the HTTP to generate encapsulated messages. Each of the first and second WSIs 432 and 434 can be configured to communicate with a service directory 436. The service directory 436 can be the service directory 112, as shown in FIG. 1, or the service directory 204, as shown in FIG. 2. The service directory 436 can be employed to enable each of the second and third OMS services 404 and 406 to communicate messages (e.g., HTTP messages) with the web service 408 in a same or similar manner as described herein (e.g., with respect to FIGS. 1 and/or 2).

In some examples, each of the second and third OMS services 404 and 406 can be configured to provide data to a respective one of the first and second WSIs 432 and 434 with information identifying the web service 306 based on the respective non-web service subscriber data. Each of the first and second WSIs 432 and 434 can be configured to encapsulate the data (e.g., by invoking a respective HTTP method, such as the HTTP method 214, as shown in FIG. 2) to provide a respective encapsulated message. The respective encapsulated message can be communicated over a communication link 438 to the web service 408 on the Internet 410. While FIG. 4 illustrates a single communication link 438 between the first and second WSIs 432 and 434 and the web service 408, in other examples, a respective communication link can be established between the first WSI 432 and the web service 408, and between the second WSIS 434 and the web service 408. In some examples, the communication link 438 can include one or more physical and/or logical connections between the OMS system 400 and a system executing the web service 408, such as a server on the Internet 410. By way of further example, at least a portion of the communication link 438 can be established across the ASL 418, which can include communication elements (e.g., internet connection circuitry and/or devices) for connecting the OMS system 400 to the Internet 410.

Because each of the second and third CALs 414 and 416 employs a respective one of the first and second WSIs 432 and 434, the second and third OMS services 404 and 406 can send data to the web service 408 and receive data from the web service 408. The first OMS service 402 is isolated from the Internet 410 and thus cannot communicate with the web service 408, such as the second or third OMS services 404 and 406. Moreover, in examples wherein the second OMS service 404 is designated as a tier 3 service, the tier 3 OMS service can be configured to employ the first WSI 432 to communicate tier 3 service data (e.g., tier 3 encapsulated messages) to the web service 408. In some examples, the third OMS service 406 is designated a tier 2 service. By configuring each of the second and third CALs 414 and 416 with the respective one of the first and second WSIs 432 and 434 enables tier 2 and 3 services of the OMS system 100 to communicate with the web service 408.

Figure 5:
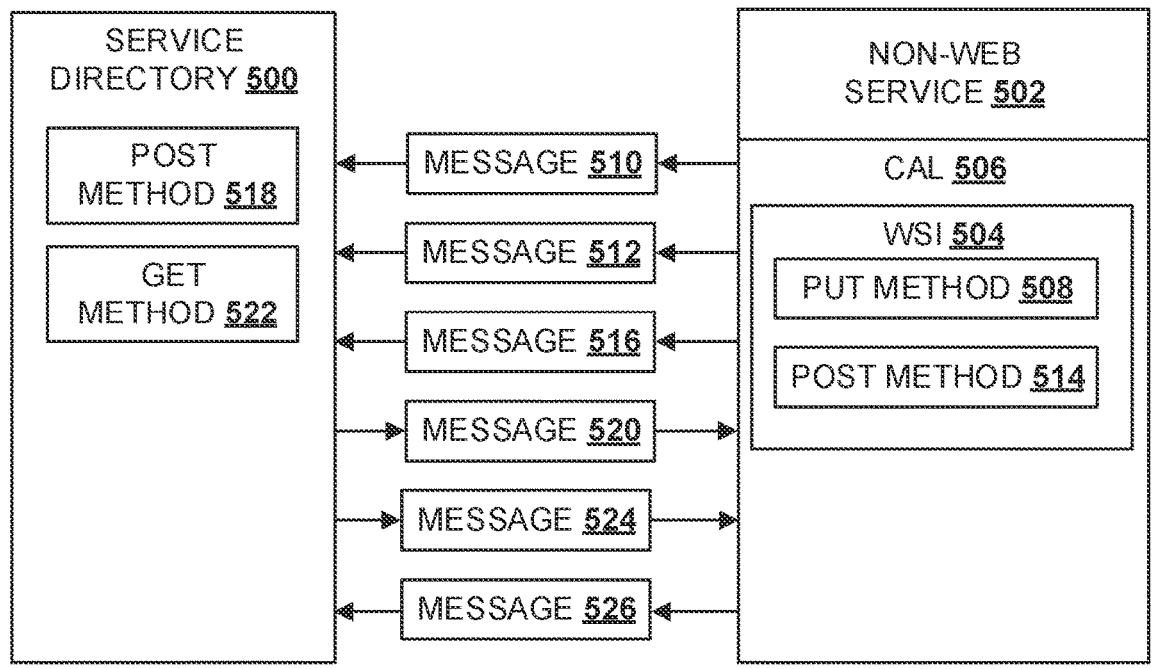
FIG. 5 is an example of a service directory communicating with a non-web service.

FIG. 5 is an example of a service directory 500 communicating with a non-web service 502. As shown in FIG. 5, a WSI 504 can be located at a CAL 506 of an OMS system (e.g., the OMS system 100, as shown in FIG. 1, or the OMS system 200, as shown in FIG. 2). In some examples, the service directory 500 can be the service directory 112, as shown in FIG. 1, or the service directory 204, as shown in FIG. 2. The WSI can be the WSI 102, as shown in FIG. 1, or the WSI 202, as shown in FIG. 2. The non-web service 502 can be the web service 106, as shown in FIG. 1. Thus, the following description of FIG. 5 can also refer to FIGS. 1 and 2.

In some examples, the non-web service 502 can be configured to communicate with the service directory 500 in response to initiating (e.g., starting up). The non-web service 502 can be configured to communicate reader and writer data (e.g., the reader and writer data 218 and 220, as shown in FIG. 2) to the service directory 500, such as described herein. In some examples, the WSI 504 can be configured to implement an HTTP method (e.g., the HTTP method 214, as shown in FIG. 2) to communicate the reader and writer data. For example, the WSI 504 can be configured to implement a PUT method 508 to update a reader location within the service directory 500 (e.g., in the publisher-subscriber database 226, as shown in FIG. 2) with the reader data. The WSI 504 can be configured to encapsulate the reader data to provide an encapsulated message 510 to the service directory 500. The service directory 500 can extract the encapsulated reader data and update the reader location of the publisher-subscriber database of the service directory 500 with the reader data. In some examples, the WSI 504 can be configured to implement the PUT method 508 to update a writer location within the service directory 500 with the writer data. The WSI 504 can be configured to encapsulate the writer data to provide an encapsulated message 512 to the service directory 500. The service directory 500 can extract the encapsulated writer data and update the writer location of the publisher-subscriber database of the service directory 500 (e.g., in the publisher-subscriber database 226, as shown in FIG. 2) with the writer data.

In some examples, the WSI 504 can be configured to receive status data from the non-web service 502. The status data can be indicative of whether the non-web service 502 is functional (e.g., online). The WSI 504 can be configured to implement a POST method 514 to update a status location of the publisher-subscriber database within the service directory 500 with a status of the non-web service 502. The WSI 504 can be configured to encapsulate the status data to provide an encapsulated message 516 to the service directory 500. The service directory 500 can extract the encapsulated status data and update the status location with the status data. The non-web service 502 can be configured to provide the status data periodically to the service directory 500. The service directory 500 can employ the status data to confirm that the non-web service is online or offline.

In some examples, the service directory 500 can be configured to implement an HTTP method (e.g., the HTTP method 232, as shown in FIG. 2). For example, the service directory 500 can be configured to implement a POST method 518 to communicate non-web service subscriber data and/or non-web service publisher data (e.g., the non-web service subscriber data 228 and/or the non-web service publisher data 230, as shown in FIG. 2) to the non-web service 502, such as described herein. The service directory 500 can be configured to encapsulate the non-web service subscriber data and/or non-web service publisher data to provide one or more encapsulated messages 520 to the WSI 504. The WSI 504 can extract the encapsulated non-web service subscriber data and/or non-web service publisher data from the one or more encapsulated messages 520 and provide the non-web service subscriber data and/or non-web service publisher data to the non-web service 502. The non-web service 502 can employ the non-web service subscriber data and/or non-web service publisher data to communicate with the web service and/or one or more other non-web services.

In some examples, the service directory 500 may be offline while the non-web service 502 is online. In response to the service directory 500 coming back online, the service directory 500 can be configured to implement a GET method 522 to communicate one or more requests for the reader and writer data from the non-web service 502. The service directory 500 can be configured to encapsulate the one or more request for reader and/or writer data to provide one or more encapsulated messages 524 to the WSI 504. The WSI 504 can extract the one or more encapsulated request for reader and/or writer data from the one or more encapsulated messages 524 and provide the one or more requests for reader and/or writer data to the non-web service 502, which can be configured to provide the encapsulated messages 510 and 512, as described herein.

In some examples, when new readers and/or writers are added to the non-web service 502, the non-web service 502 can trigger the PUT method 508 to communicate the new reader and/or writer data as one or more encapsulated messages 510 and/or 512. In some examples, the non-web service 502 can be a new non-web service that had not previously communicated with the service directory 500. The non-web service 502 can be configured to communicate the status data to the service directory 500. The service directory 500 can be configured to provide the one or more encapsulated messages 524 to the WSI 504 for reader and/or writer data from the non-web service 502. The non-web service 502 can provide the reader and/or writer data as respective encapsulated messages 510 and 512 to the service directory 500, as described herein.

In some examples, the non-web service 502 can go offline and stop transmitting the status data. For example, if the service directory 500 does not receive the status data within a period of time (e.g., every second) this can be indicative that the non-web service 502 is off-line. If the service directory 500 does not receive the status data within the defined period of time, the service directory 500 can remove publishers and subscribers of the non-web service 502 from the publisher-subscriber database as described herein. In some examples, the non-web service 502 before going offline can generate a delete request to remove the publishers and subscribers of the non-web service 502. The WSI 504 can encapsulate the delete request to provide an encapsulated message 526. The service directory 500 can extract the delete request from the encapsulated message 526. The service directory 500 can remove the publishers and subscribers for the non-web service 502 in response to the delete request.

Figure 6:
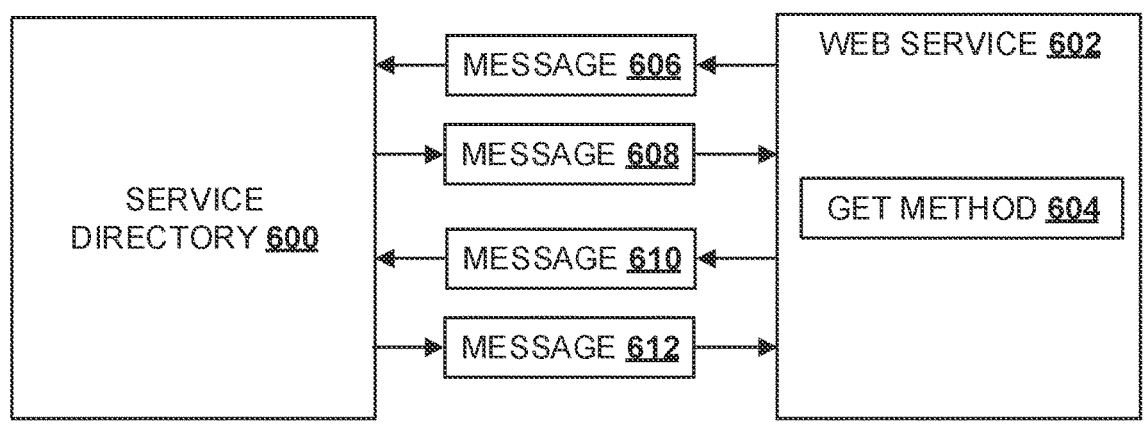
FIG. 6 is an example of a service directory communicating with a web service.

FIG. 6 is an example of a service directory 600 communicating with a web service 602. In some examples, the service directory 600 can be the service directory 112, as shown in FIG. 1, or the service directory 204, as shown in FIG. 2. The web service 602 can be the web service 106, as shown in FIG. 1. Thus, the following description of FIG. 6 can also refer to FIGS. 1-2. In some examples, the web service 602 can be configured to invoke an HTTP method, as described herein. The web service 602 can employ the service directory 600 as a lookup table to know which publishers to GET from, or which subscribers to POST to. For example, the web service 602 can be configured to invoke a GET method 604 to retrieve web service subscriber data and/or web service publisher data (e.g., the web service subscriber data 238 and/or the web service publisher data 240, as shown in FIG. 2). The web service 602 can be configured to encapsulate one or more requests for the web service subscriber data and/or web service publisher data to provide one or more encapsulated messages 606 to the service directory 600. The service directory 600 can be configured to extract the one or more requests from the one or more encapsulated messages 606 and provide the web service subscriber data and/or web service publisher data in one or more response encapsulated messages 608 based on the one or more requests. The web service 602 can employ the web service subscriber data and/or web service publisher data to provide and retrieve data form one or more non-web services, such as described herein.

Figure 7:
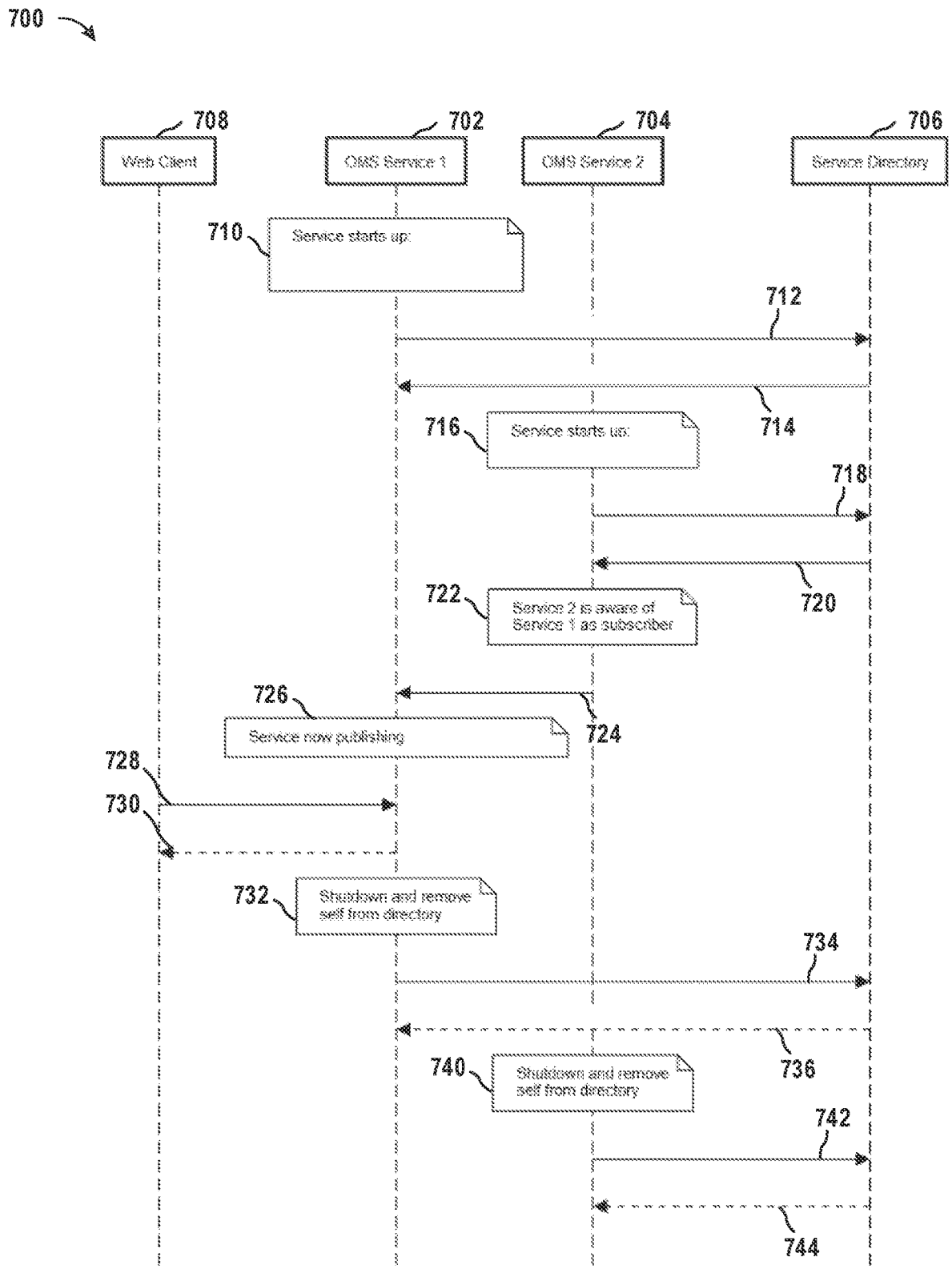
FIG. 7 is an example of a communication diagram.

FIG. 7 is a further example of a communication diagram 700. The communication diagram 700 includes a first OMS service 702, a second OMS service 704, a service directory 706, and a web client 708. The first OMS service 702 can correspond to the non-web service 104, as shown in FIG. 1, or the non-web service 206, as shown in FIG. 2. In some examples, the second OMS service 704 can correspond to the non-web service 104, as shown in FIG. 1, or the non-web service 206, as shown in FIG. 2. The service directory 706 can correspond to the service directory 112, as shown in FIG. 1, or the service directory 204, as shown in FIG. 2. Thus, the following description of FIG. 7 can also refer to FIGS. 1-2.

At 710, the first OMS service 702 can be initiated (e.g., started). The first OMS service 702 can be configured to publish status data and can be configured as a subscriber to receive status data for another service, such as the second OMS service 702 based on the service directory 706 (e.g., the publisher-subscriber data 226, as shown in FIG. 2). In some examples, the first OMS service 702 can be configured to provide the status data as one or more messages by invoking a WSI (e.g., in response to receiving a request for the status data). The first OMS service 702 can be configured to provide reader and writer data (e.g., the reader and writer data 218 and 220, as shown in FIG. 2) to the service directory 706. For example, at 712, the first OMS service 702 can be configured to invoke a first WSI (e.g., the WSI 102, as shown in FIG. 1) to implement a PUT method to provide the reader and writer data as a message (or a combination of messages) to the service directory 706. At 714, the service directory 706 can be configured to implement a POST method to provide first non-web service subscriber data (e.g., the non-web service subscriber data 228, as shown in FIG. 2) as a message for the first OMS service 702.

In some examples, at 716, the second OMS service 704 can be initiated (e.g., started). The second OMS service 704 can be configured to provide reader and writer data (e.g., the reader and writer data 218 and 220, as shown in FIG. 2) to the service directory 706. For example, at 718, the second OMS service 704 can be configured to invoke a second WSI (e.g., the WSI 102, as shown in FIG. 1) to implement a PUT method to provide the reader and writer data as a message to the service directory 706. At 720, the service directory 706 can be configured to implement a POST method to provide second non-web service subscriber data (e.g., the non-web service subscriber data 228, as shown in FIG. 2) as a message for the second OMS service 704. Because the second non-web service subscriber data identifies the first OMS service 702 as a subscriber of messages provided by the second OMS service 704, at 722, the second OMS service 704 can be indicated as being aware of the first OMS service 702 as a subscriber.

In some examples, the second OMS service 704 can be configured to provide a request to publish status data. For example, at 724, the second OMS service 704 can be configured to invoke the second WSI to implement a POST method to communicate a message with the request to publish status data to the first OMS service 702. At 726, the first OMS service 702 can be configured to publish status data. At 728, the web client 708 can be configured to invoke a GET method to communicate to the first OMS service 702 a message with a request for status data indicative of a status of the first OMS service 702. In some examples, the web client 708 can be configured to invoke a GET method to generate a message for web client subscriber data similar to the web service subscriber data described herein. The message for the web client subscriber data can be provided to the service directory 706, which can be configured to provide the web client subscriber data to the web client 808 in a response message, thereby enabling the web client 708 to communicate with the first OMS service 702. Thus, in some examples, the service directory 706 (e.g., the publisher-subscriber database 226, as shown in FIG. 2) can store the web client subscriber data. For example, the web client subscriber data can identify one or more other services, such as the first OMS web service 702 and/or the second OMS web service 704 as subscribers of messages generated by the web client 708. At 730, the first OMS service 702 can be configured to provide to the web client 708 a message with the status data indicative of the status of the first OMS service 702.

In some examples, at 732, a removal of the first OMS service 702 from the service directory 706 can be initiated before shutting down. For example, at 734, the first OMS service 702 can be configured to invoke an HTTP method (e.g., a PUT method) to provide a message that includes a first request to delete the reader and writer data for the first OMS service 702 from the service directory 706. At 736, the service directory 706 can be configured to invoke an HTTP method (e.g., a POST method) to provide a message that includes a first confirmation that the reader and writer data for the first OMS service 702 has been deleted from the service directory 706. In some examples, the first OMS service 702 can be configured to shut down after or in response to receiving the first confirmation that the reader and writer data for the first OMS service 702 has been deleted from the service directory 706.

In some examples, at 740, a removal of the second OMS service 704 from the service directory 706 can be initiated before shutting down. For example, at 742, the second OMS service 704 can be configured to invoke an HTTP method (e.g., a PUT method) to provide a message that includes a second request to delete the reader and writer data for the second OMS service 704 from the service directory 706. At 744, the service directory 706 can be configured to invoke the HTTP method (e.g., the POST method) to provide a message that includes a second confirmation that the reader and writer data for the second OMS service 704 has been deleted from the service directory 706. In some examples, the second OMS service 704 can be configured to shut down after or in response to receiving the second confirmation that the reader and writer data for the second OMS service 704 has been deleted from the service directory 706.

Figure 8:
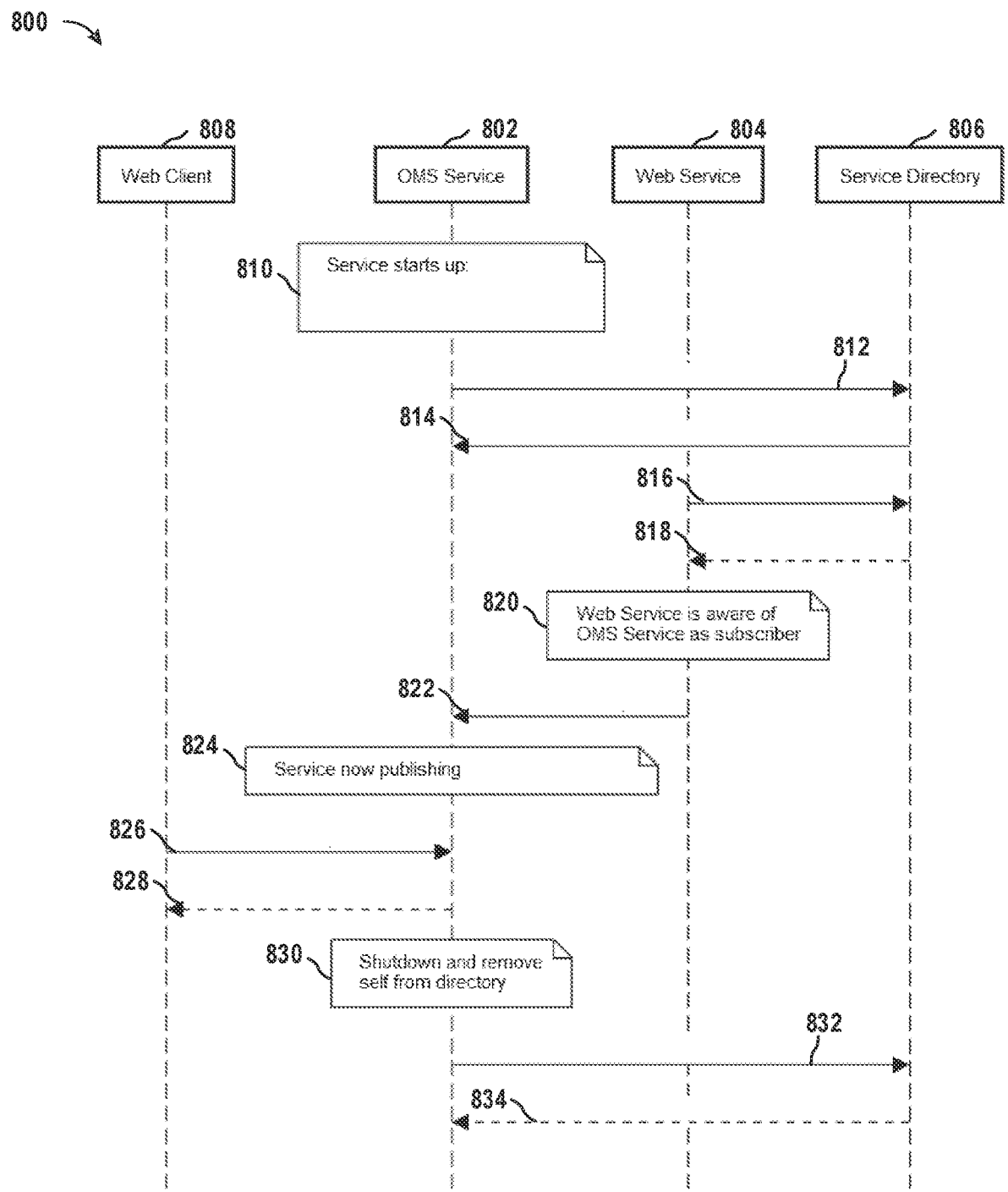
FIG. 8 is another example of a communication diagram.

FIG. 8 another example of another communication diagram 800. The communication diagram 800 includes an OMS service 802, a web service 804, a service directory 806, and a web client 808. The OMS service 802 can correspond to the non-web service 104, as shown in FIG. 1, or the non-web service 206, as shown in FIG. 2. The web service 804 can correspond to the web service 106, as shown in FIG. 1. The service directory 806 can correspond to the service directory 112, as shown in FIG. 1, or the service directory 204, as shown in FIG. 2. Thus, the following description of FIG. 8 can also refer to FIGS. 1-2.

At 810, the OMS service 802 can be initiated (e.g., started). By way of example, the first OMS service 802 can be configured to publish status data and in some examples can be configured as a subscriber to receive status data for another service based on the service directory 806 (e.g., the publisher-subscriber data 226, as shown in FIG. 2). In some examples, the OMS service 802 can be configured to provide the status data as one or more messages by invoking a WSI (e.g., in response to receiving a request for the status data, such as from the web client 808). The OMS service 802 can be configured to provide reader and writer data (e.g., the reader and writer data 218 and 220, as shown in FIG. 2) to the service directory 806. For example, at 812, the OMS service 802 can invoke a WSI (e.g., the WSI 102, as shown in FIG. 1) to implement a PUT method to provide the reader and writer data as a message to the service directory 706. At 814, the service directory 806 can be configured to invoke a POST method to provide non-web service subscriber data (e.g., the non-web service subscriber data 228, as shown in FIG. 2) as a message for the OMS service 802.

In some examples, at 816, the web service 804 can be configured to invoke a GET method to generate a message for web service subscriber data (e.g., the web service subscriber data 238, as shown in FIG. 2). At 818, the service directory 806 can be configured to invoke an HTTP method (e.g., the POST method) to provide web service subscriber data as a message for the web service 804. Because the web service subscriber data identifies the OMS service 802 as a subscriber of messages provided by the web service 804, at 820, the web service 804 can become aware of the OMS service 802 as a subscriber.

In some examples, the web service 804 can be configured to provide a request to publish status data. For example, at 822, the web service 804 can be configured to invoke a POST method to communicate a message with the request to publish status data to the OMS service 802. At 824, the OMS service 802 can be configured to publish status data. At 826, the web client 808 can be configured to invoke a GET method to communicate to the OMS service 802 a message with a request for status data indicative of a status of the OMS service 802. At 828, the OMS service 802 can be configured to provide to the web client 808 a message with the status data indicative of the status of the OMS service 802.

In some examples, at 830, a removal of the OMS service 802 from the service directory 806 can be initiated before shutting down. For example, at 832, the OMS service 802 can be configured to invoke an HTTP method (e.g., a PUT method) to provide a message that includes a request to delete the reader and writer data for the OMS service 802 from the service directory 806. At 834, the service directory 806 can be configured to invoke an HTTP method (e.g., a POST method) to provide a message that includes a confirmation that the reader and writer data for the OMS service 802 has been deleted from the service directory 806. In some examples, the OMS service 802 can be configured to shut down after or in response to receiving the confirmation that the reader and writer data for the OMS service 802 has been deleted from the service directory 806.

Figure 9:
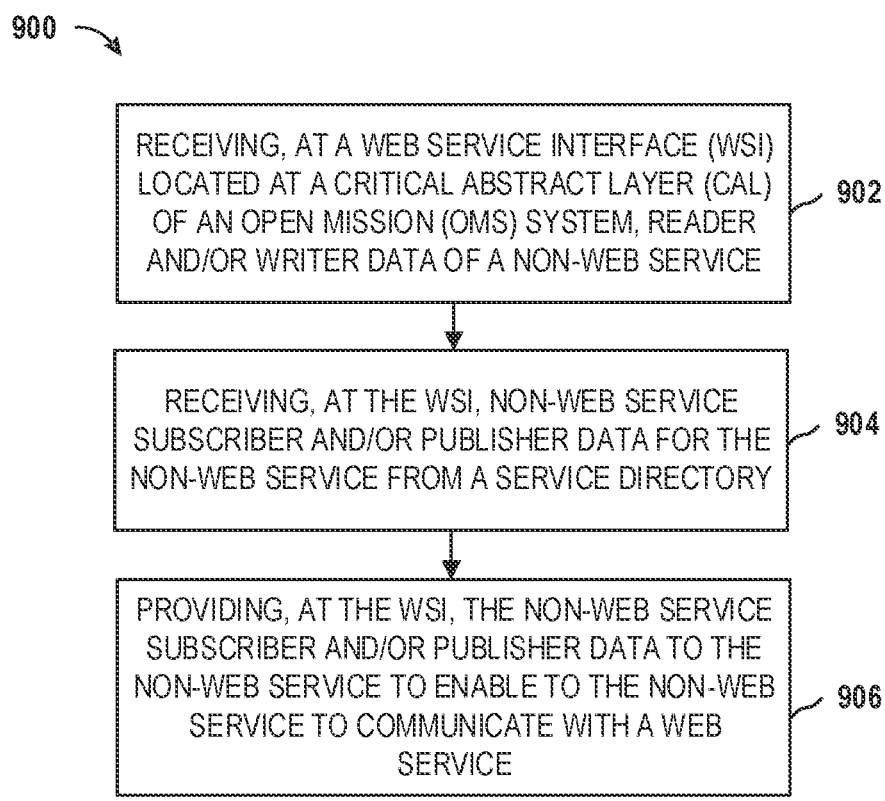
FIG. 9 is an example of a method for enabling a non-web service to communicate with a web service.
Figure 10:
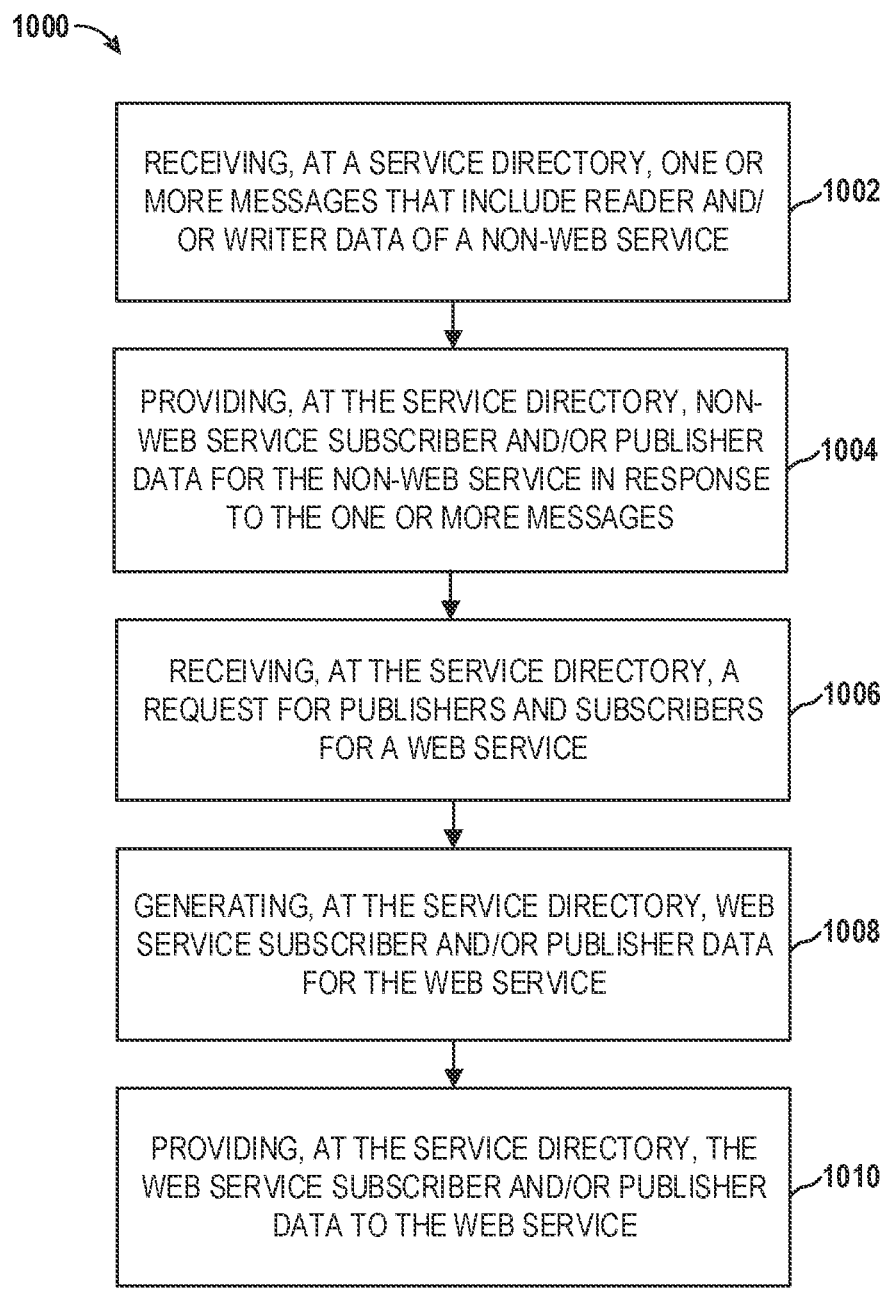
FIG. 10 is another example of a method for enabling communication between a web service and a non-web service.

In view of the foregoing structural and functional features described above, an example method will be better appreciated with reference to FIGS. 9-10. While, for purposes of simplicity of explanation, the example methods of FIGS. 9-10 are shown and described as executing serially, it is to be understood and appreciated that the example methods are not limited by the illustrated order, as some actions could in other examples occur in different orders, multiple times and/or concurrently from that shown and described herein.

FIG. 9 is an example of a method for enabling a non-web service to communicate with a web service. The method 900 can be implemented by a WSI, such as the WSI described herein (e.g., the WSI 102, as shown in FIG. 1). Thus, the following description of FIG. 9 can also refer to FIGS. 1-2. The method 900 can begin at 902 by providing, at the WSI, reader and/or writer data of the non-web service (e.g., the non-web service 104, as shown in FIG. 1) to a service directory (e.g., the service directory 112, as shown in FIG. 1). The WSI can be located at a CAL of an OMS system (e.g., the CAL 108 of the OMS system 100, as shown in FIG. 1). At 904, non-web service subscriber data and/or non-web service publisher data (e.g., the non-web service subscriber data 228 and/or the non-web service publisher data 230, as shown in FIG. 2) can be received at the WSI. At 906, the WSI can provide the non-web service subscriber data and/or non-web service publisher data to the non-web service to enable the non-web service to communicate with the web service.

FIG. 10 is another example of a method 1000 for enabling communication between a web service located on an Internet and a non-web service of an OMS system. The method 1000 can be implemented by a service directory, such as the service directory 112, as shown in FIG. 1, or the service directory 204, as shown in FIG. 2. Therefore, reference can be made to the examples of FIGS. 1-2 in the following description of the example of FIG. 10. The method 1000 can begin at 1002 by receiving, at the service directory, one or more messages that can include reader and/or writer data of the non-web service. The one or more messages can be generated by a WSI (e.g., the WSI 102, as shown in FIG. 1) located at CAL of an OMS system (e.g., the CAL 108 of the OMS system 100, as shown in FIG. 1). At 1004, the service directory can be configured to provide non-web service subscriber data and/or non-web service publisher data (e.g., the non-web service subscriber data 228 and/or the non-web service publisher data 230) for the non-web service in response to the receiving the reader and/or writer data of the non-web service. The non-web service subscriber data and/or the non-web service publisher data can be provided to the non-web service to enable the non-web service to communicate with the web service. At 1006, the service directory can be configured to receive a request for publishers and/or subscribers for the web service. At 1008, the service directory can be configured to generate web service subscriber data (e.g., the web service subscriber data 234, as shown in FIG. 2) and/or web service publisher data (e.g., the web service publisher data 240, as shown in FIG. 2) based on the reader and/or writer data of the non-web service. At 1110 the service directory can be configured to provide the web service subscriber data and/or the web service publisher data to the web service to enable the web service to communicate with the non-web service.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   memory to store machine-readable instructions and data;
   one or more processors to access the memory and execute the machine readable instructions, the machine-readable instructions comprising:
      a web service interface (WSI) located at a critical abstract layer (CAL) and configured to communicate with a non-web service; and
      a service directory configured to:
         receive a registration request from the WSI;
         register the non-web service based on the registration request from the WSI;
         provide web service subscriber and publisher data to a web service located on the Internet to enable the web service to communicate messages to and receive messages from the non-web service in response to the non-web service registering with the service directory, wherein the web service subscriber data identifies the non-web service as a subscriber of messages provided by the web service and the web service publisher data identifies the non-web service as a publisher of messages from which the web service is to retrieve messages;
         receive, a registration request from the web service;
         register the web service based on the registration request from the web service;
         provide non-web service subscriber and publisher data to the WSI in response to the web service registering with the service directory, wherein the non-web service subscriber data identifies the web service as a subscriber of messages provided by the non-web service and the non-web service publisher data identifies the web service as a publisher of messages from which the non-web service is to retrieve messages, and
         wherein the WSI is configured to provide the non-web web service subscriber and publisher data to the non-web service to enable the non-web service to communicate messages to and receive messages from the web service.

2. The system of claim 1, wherein the WSI is configured according to an open mission system standard.

3. The system of claim 2, wherein the WSI comprises a Hypertext Transfer Protocol (HTTP) method, the non-web service be configured to invoke the HTTP method to communicate the messages according to an HTTP protocol to the web service, wherein the messages generated by the non-web service are not routed through the service directory to the web service and the messages generated by the web service are not routed through the service directory to the non-web service.

4. The system of claim 3, wherein the service directory comprises a service message interface (SMI) and a publisher-subscriber database, the SMI being configured to receive the registration request from the non-web service, wherein the registration request includes the web service subscriber and publisher data for registration with the service directory, and wherein the SMI is configured to store the web service subscriber and publisher data in the publisher-subscriber database to register the non-web service with the service directory.

5. The system of claim 4, wherein the SMI is configured to receive the registration request from the web service for registration with the service directory, wherein the registration request includes the non-web service subscriber and publisher data, and wherein the SMI is configured to store the non-web service subscriber and publisher data in the publisher-subscriber database to register the web service with the service directory.

6. The system of claim 5, wherein the non-web service is configured to periodically communicate a status message to the service directory to indicate that the non-web service is online, and the service directory is configured to remove the non-web service as a publisher of messages to the web service and a subscriber of messages from the web service in response to not receiving the status message for a period of time, the service directory being configured to provide updated web service subscriber and publisher data to the web service to disable the web service from communicating messages to and receiving messages from the non-web service, wherein the updated web service subscriber data does not identify the non-web service as a subscriber of messages provided by the web service and the updated web service publisher data does not identify the non-web service as a publisher of messages from which the web service is to retrieve messages.

7. The system of claim 5, wherein the WSI is configured to receive a delete request and generate a delete message that includes the delete request for removing the non-web service as a publisher of messages to the web service and a subscriber of messages from the web service.

8. The system of claim 7, wherein the service directory is configured to remove the non-web service as a publisher of messages to the web service and a subscriber of messages from the web service in response to the delete message, the service directory being configured to provide updated web service subscriber and publisher data to the web service to disable the web service from communicating messages to and receiving messages from the non-web service, wherein the updated web service subscriber data does not identify the non-web service as a subscriber of messages provided by the web service and the updated web service publisher data does not identify the non-web service as a publisher of messages from which the web service is to retrieve messages.

9. The system of claim 6, wherein the WSI is configured to receive the non-web service subscriber and publisher data as one or more messages from the service directory, and the WSI comprises an extractor, the extractor being configured to extract the non-web service subscriber and publisher data from the one or more messages and provide the extracted non-web service subscriber and publisher data to the non-web service to enable the non-web service to communicate with the web service.

10. The system of claim 9, wherein the SMI is further configured to receive one or more requests for subscribers of messages provided by the web service and publishers of messages from which the web service is enabled to retrieve messages.

11. The system of claim 10, wherein the SMI is configured to query the publisher-subscriber database for the subscribers of messages provided by the web service and the publishers of messages from which the web service is enabled to retrieve messages based on the one or more requests, the web service subscriber and publisher data being provided in response to the querying of the publisher-subscriber database.

12. The system of claim 11, wherein the WSI is configured to communicate periodically to the service directory the status message that includes status data indicating that the non-web service is online.

13. A system comprising:
memory to store machine-readable instructions and data of the system;
one or more processors to access the memory and execute the machine-readable instructions, the machine-readable instructions causing the one or more processors to:
receive a registration request that includes web service subscriber and publisher data from a web service interface (WSI) that is located at a critical abstract layer (CAL), wherein the web service subscriber data identifies the non-web service as a subscriber of messages provided by a web service located on the Internet and the web service publisher data identifies the non-web service as a publisher of messages from which the web service is to retrieve messages;
store at a publisher-subscriber database the web service subscriber and publisher data to register the non-web service with the service directory; and
provide the web service subscriber and publisher data to the web service to enable the web service to communicate messages to and receive messages from the non-web service in response to registering the non-web service with the service directory;
query the publisher-subscriber database for non-web service subscriber and publisher data for the non-web service, wherein the non-web service subscriber data identifies the web service as a subscriber of messages provided by the non-web service and the non-web service publisher data identifies the web service as a publisher of messages from which the non-web service is to retrieve messages;
receive the non-web service subscriber and publisher data from the publisher-subscriber database in response to the query;
provide the non-web service subscriber and publisher data to the WSI;
provide the non-web service subscriber and publisher data from the WSI to the non-web service to enable the non-web service to communicate messages to and receive messages from the web service.

14. The system of claim 13, wherein the system is configured according to an open mission system (OMS) standard, and the data of the system includes the WSI and the non-web service.

15. The system of claim 14, wherein the data of the system includes the CAL, the CAL including the WSI, the WSI being implemented as a web server.

16. The system of claim 15, wherein the machine-readable instructions further cause the processor to:
receive periodically a status message indicative of whether the non-web service is online; and
remove the non-web service as a publisher of messages to the web service and a subscriber of messages from the web service by deleting the web service subscriber and publisher data in response to not receiving the status message for a period of time; and
provide updated web service subscriber and publisher data to the web service to disable the web service from communicating messages to and receiving messages from the non-web service, wherein the updated web service subscriber data does not identify the non-web service as a subscriber of messages provided by the web service and the updated web service publisher data does not identify the non-web service as a publisher of messages from which the web service is to retrieve messages.

17. A method comprising:
receiving, at a web service interface (WSI), a registration request from a non-web service for registration with a service directory, the WSI being located at a critical abstract layer of a system that is configured according to an open mission system (OMS) standard and that includes the non-web service;
registering the non-web service with the service directory based on the registration request from the non-web service;
providing web service subscriber and publisher data to a web service located on the Internet to enable the web service to communicate messages to and receive messages from the non-web service in response to the non-web service registering with the service directory, wherein the web service subscriber data identifies the non-web service as a subscriber of messages provided by the web service and the web service publisher data identifies the non-web service as a publisher of messages from which the web service is to retrieve messages;
receiving, at the service directory, a registration request from the web service to register with the service directory;
registering the web service with the service directory based on the registration request from the web service;
providing non-web service subscriber and publisher data for the non-web service to the WSI in response to registering the web service with the service directory, wherein the non-web service subscriber data identifies the web service as a subscriber of messages provided by the non-web service and the non-web service publisher data identifies the web service as a publisher of messages from which the non-web service is to retrieve messages; and providing the non-web service subscriber and publisher data from the WSI to the non-web service to enable the non-web service to communicate messages to and receive messages from the web service.

18. The method of claim 17, further comprising receiving, at the service directory, periodically status messages indicating whether the non-web service is online, the status data being provided by the non-web service; and removing the non-web service from the service directory as a publisher of messages to the web service and a subscriber of messages from the web service in response to not receiving a status message within a defined period of time;

causing, at the service directory, updated web service subscriber and publisher to be provided to the web service to disable the web service from communicating with the non-web service, wherein the updated web service subscriber data does not identify the non-web service as a subscriber of messages provided by the web service and the updated web service publisher data does not identify the non-web service as a publisher of messages from which the web service is to retrieve messages.

\* \* \* \* \*